United States Patent
Tenghamn

(10) Patent No.: US 7,167,412 B2
(45) Date of Patent: Jan. 23, 2007

(54) APPARATUS FOR STEERING A MARINE SEISMIC STREAMER VIA CONTROLLED BENDING

(75) Inventor: Stig Rune Lennart Tenghamn, Katy, TX (US)

(73) Assignee: PGS Americas, Inc., Houston, TX (US)

(*) Notice: Subject to any disclaimer, the term of this patent is extended or adjusted under 35 U.S.C. 154(b) by 0 days.

(21) Appl. No.: 11/016,168

(22) Filed: Dec. 17, 2004

(65) Prior Publication Data

US 2006/0133199 A1    Jun. 22, 2006

(51) Int. Cl.
*G01V 1/38* (2006.01)

(52) U.S. Cl. ............ 367/16; 367/15; 367/17; 367/18; 114/246; 114/253

(58) Field of Classification Search .......... 367/15, 367/16, 17, 18; 114/245, 246, 251, 253
See application file for complete search history.

(56) References Cited

U.S. PATENT DOCUMENTS

| | | | | |
|---|---|---|---|---|
| 3,432,000 A | * | 3/1969 | Mast et al. ............... 367/155 |
| 3,531,762 A | * | 9/1970 | Tickell ..................... 367/17 |
| 3,680,520 A | * | 8/1972 | Smith ....................... 114/245 |
| 4,404,664 A | * | 9/1983 | Zachariadis ............... 367/19 |
| 4,450,543 A | | 5/1984 | Neeley |
| 4,901,287 A | * | 2/1990 | Hathaway et al. ......... 367/20 |
| 5,110,224 A | * | 5/1992 | Taylor et al. .............. 385/25 |
| 5,357,892 A | * | 10/1994 | Vatne et al. ............... 114/244 |
| 5,402,745 A | * | 4/1995 | Wood ....................... 114/244 |
| 5,408,947 A | * | 4/1995 | Curto et al. ............... 114/253 |
| 5,443,027 A | | 8/1995 | Owsley et al. |
| 5,561,640 A | * | 10/1996 | Maciejewski ............. 367/20 |
| 5,619,474 A | * | 4/1997 | Kuche ..................... 367/17 |
| 6,011,752 A | | 1/2000 | Ambs et al. |
| 6,016,286 A | | 1/2000 | Olivier et al. |
| 6,074,253 A | * | 6/2000 | Brinchmann-Hansen .... 439/624 |
| 6,226,225 B1 | * | 5/2001 | Barker ..................... 367/17 |
| 6,498,768 B1 | * | 12/2002 | Gjestrum et al. .......... 367/20 |
| 6,504,792 B2 | * | 1/2003 | Barker ..................... 367/20 |
| 6,525,992 B1 | | 2/2003 | Olivier et al. |
| 6,559,383 B1 | * | 5/2003 | Martin ..................... 174/84 R |
| 6,671,223 B2 | | 12/2003 | Bittleston |

FOREIGN PATENT DOCUMENTS

EP    0 262 951    4/1988

* cited by examiner

*Primary Examiner*—Deandra Hughes
*Assistant Examiner*—Scott A. Hughes
(74) *Attorney, Agent, or Firm*—E. Eugene Thigpen; Charles R. Schweppe

(57) ABSTRACT

A marine seismic streamer steering device comprises at least two hinged sections pivotally coupled to each other and connected between two adjacent sections of the seismic streamer, and a bend control unit that controls bending of the hinged sections relative to the longitudinal axis of the seismic streamer. The steering device further comprises a roll sensor which determines rotational orientation of the body and transmits the orientation to the bend control unit, a lateral position sensor which determines lateral position of the body and transmits the lateral position to the bend control unit, and a depth sensor which determines depth of the body and transmits the depth to the bend control unit. The bend control unit then controls the bending of the hinged sections based on the transmitted rotational orientation, lateral position, and depth of the body.

8 Claims, 1 Drawing Sheet

APPARATUS FOR STEERING A MARINE SEISMIC STREAMER VIA CONTROLLED BENDING

CROSS-REFERENCES TO RELATED APPLICATIONS

Not Applicable

FEDERALLY SPONSOR RESEARCH OR DEVELOPMENT

Not Applicable

SEQUENCE LISTING, TABLE, OR COMPUTER LISTING

Not Applicable

BACKGROUND OF THE INVENTION

1. Field of the Invention

This invention relates generally to the field of geophysical prospecting and more particularly to the field of marine seismic surveys. Specifically, the invention is an apparatus for steering a marine seismic streamer.

2. Description of the Related Art

In the field of geophysical prospecting, knowledge of the subsurface structure of the earth is useful for finding and extracting valuable mineral resources, such as oil and natural gas. A well-known tool of geophysical prospecting is a seismic survey. A seismic survey transmits acoustic waves emitted from appropriate energy sources into the earth and collects the reflected signals using an array of sensors. Then seismic data processing techniques are applied to the collected data to estimate the subsurface structure.

In a seismic survey, the seismic signal is generated by injecting an acoustic signal from on or near the earth's surface, which then travels downwardly into the subsurface of the earth. In a marine survey, the acoustic signal may also travel downwardly through a body of water. Appropriate energy sources may include explosives or vibrators on land and air guns or marine vibrators in water. When the acoustic signal encounters a seismic reflector, an interface between two subsurface strata having different acoustic impedances, a portion of the acoustic signal is reflected back to the surface, where the reflected energy is detected by a sensor. Seismic sensors detect and measure the amplitude of different physical aspects of the passing seismic waves.

Appropriate types of seismic sensors may include particle velocity sensors in land surveys and water pressure sensors in marine surveys. Sometimes particle motion or particle acceleration sensors are used instead of particle velocity sensors. Particle velocity sensors are commonly know in the art as geophones and water pressure sensors are commonly know in the art as hydrophones. Both seismic sources and seismic sensors may be deployed by themselves or, more commonly, in arrays. Additionally, pressure sensors and particle velocity sensors may be deployed together, co-located in pairs or pairs of arrays along a seismic cable, in a marine survey.

In a typical marine seismic survey, a seismic vessel travels on the water surface, typically at about 5 knots, and contains seismic acquisition control equipment, such as navigation control, seismic source control, seismic sensor control, and recording equipment. The seismic acquisition control equipment causes a seismic source towed in the body of water by the seismic vessel to actuate at selected times. The seismic source may be of any type well known in the art of seismic acquisition, including airguns or water guns, or particularly, arrays of airguns. Seismic streamers, also called seismic cables, are elongate cable-like structures towed in the body of water by the original seismic survey vessel or by another seismic survey ship. Typically, a plurality of seismic streamers are towed behind the seismic vessel. The seismic streamers contain sensors to detect the reflected wavefields initiated by the seismic source and reflected from interfaces in the environment. Conventionally, the seismic streamers contain pressure sensors such as hydrophones, but seismic streamers known as dual sensor seismic streamers also contain water particle motion sensors such as geophones. The hydrophones and geophones are typically co-located in pairs or pairs of sensor arrays at regular intervals along the seismic streamers.

Seismic streamers also comprise electronic modules, electrical wires and sensors apart from the actual framework. Seismic streamers are typically divided into sections approximately 100 meters in length, and can have a total length of thousands of meters. A seismic towing system comprises seismic sources and seismic streamers. A common feature of these units is that they can be positioned astern of and to the side of the line of travel of the seismic vessel. In addition, they are submerged in the water, with the seismic sources typically at a depth of 5–15 meters below the water surface and the seismic streamers typically at a depth of 5–40 meters. None of these above figures are absolute, and can, of course, vary outside the limits given here.

The seismic energy recorded by each pair of sources and sensors during the data acquisition stage is known as a seismic trace. Seismic data traces contain the desired seismic reflections, known as the primary reflections or primaries. A primary reflection comes from the detection of an acoustic signal that travels from a source to a sensor with but a single reflection from a subsurface seismic reflector. The seismic traces obtained in performing the survey must be processed to compensate for various factors that impede utilization of the original traces, prior to final display and analysis of a representation of the earth strata in the area being surveyed.

Seismic towing operations are becoming progressively more complex, becoming composed of more sources and streamers. Increasing demands are also being made on the efficiency of the towing system. The efficiency can usually be measured on the basis of the extent of coverage obtained by a seismic tow. The coverage will be dependent upon the width of the tow. One of the factors to which particular importance is attached is the positioning of the seismic tow. The quality of the collected seismic data is dependent on how accurately the towing system has been positioned. In this context, the term positioned refers to how each unit in the towing system, sources and streamers, is positioned in relation to the others in the longitudinal and width directions.

In marine seismic surveys, the seismic streamers are typically towed at a predetermined constant depth, often at about ten meters, in order to facilitate the removal of undesired "ghost" reflections from the surface of the water. To keep the streamers at a constant depth, control devices are used which are attached to each streamer, normally at intervals of every three streamer sections, or about every 300 meters. These control devices are commonly known as "birds", due to their use of control surfaces resembling wings.

Typical bird systems are provided by companies such as Digicourse, Inc., now part of Input/Output, Inc. of Stafford, Tex. and Geospace Technologies, now part of OYO Geospace Corporation of Houston, Tex. These birds only control depth and have wings that change their angle to keep the streamer at a fixed depth. Examples of the Digicourse birds are disclosed in U.S. Pat. No. 6,016,286 "Depth Control Device for an Underwater Cable" to Olivier et al. and U.S. Pat. No. 6,525,992 "Devices for Controlling the Position of an Underwater Cable" to Olivier et al.

The bird disclosed in the Olivier et al. U.S. Pat. No. 6,016,286 comprises a body suspended below a streamer section, a pair of arms connecting the body to the streamer, and a pair of wings pivotally mounted on the body. The bird further comprises a rotary actuator with a rotating output shaft connected to a swash plate, so that rotation of the swash plate by the actuator causes a rocker arm to pivot about an axis transverse to the axis of the output shaft. The rocker arm is drivingly connected to a drive shaft for rotating the wings about their pitch axes. The bird units have to be detached before the streamer can be stored on a streamer winch.

The bird disclosed in the Olivier et al. U.S. Pat. No. 6,525,992 comprises a body fixedly mounted beneath a streamer section, a pair of wings attached to the body, and sensors to determine the angular position of the wings. A pair of actuators are disposed in the body and coupled to the wings to respond to the sensor signals to control the angular position of the wings and, hence, the depth and lateral position of the streamer. Again, the bird units have to be detached before the streamer can be stored on a streamer winch.

The birds disclosed in the Olivier et al. patents are typical of currently used depth controllers. The depth controllers are usually characterized by a pair of wings or vanes rotatable about a fixed horizontal axis perpendicular to the streamer. The vanes assume a particular climbing or diving angle, dependent on the instantaneous depth within the water of the streamer section to which the controller is attached. The rotation of the vanes about the horizontal axis is often controlled by a pressure-responsive device. When the streamer's controller falls below a reference depth, its vanes rotate into a position to produce positive lift and the controller will lift the streamer. On the other hand, when the streamer climbs above the reference depth, the vanes rotate to produce negative lift and the controller will lower the streamer. In this manner, the streamer is automatically maintained within a prescribed depth range.

Depth controllers in accordance with these current designs suffer from a number of disadvantages. The birds usually hang beneath the streamer and the vanes protrude away from the body of the depth controller. Thus, the birds generate turbulence and produce considerable undesired noise as they are towed through the water. This noise interferes with the reflected signals detected by the hydrophones and geophones in the streamers. The hanging of the birds from the streamers also means that the birds need to be detached each time the streamer is retrieved and re-attached each time the streamer is re-deployed, which is rather time consuming. Additionally, storage of the birds aboard ship requires excessive space, since their vanes cannot be retracted into the bodies of the controllers.

Another drawback is that the fully-exposed vanes have a tendency to snag debris such as seaweed. Such foreign matter may foul the vanes and interfere with their functioning, especially when the foreign matter becomes wedged between the vanes and the body. Often, the vanes become snagged on a reef or wreck, thereby completely and abruptly stopping the streamer while under tow and causing the streamer to become severed. Under such circumstances, a part or all of a very expensive streamer may be irretrievably lost.

Yet another drawback is that the birds are often battery-powered and the batteries can run out before the survey is completed. This power stoppage necessitates either retrieval of the streamer for battery replacement, or deployment of a work boat to replace the battery in the water. The former operation is very time consuming, while the latter can be hazardous.

During a marine seismic survey, the streamers are intended to remain straight, parallel to each other and equally spaced. Current, wind, and waves deflect the streamer cables from their intended paths, a problem called "feathering", and streamer drift is a continuing problem in marine seismic surveys. By controlling the position and shape of the streamer cables, entanglement of the streamer cables is avoided and collisions with offshore hazards such as marine drilling rigs and production platforms are prevented. Additionally, lack of lateral control can adversely affect the coverage of the survey, frequently requiring that certain parts of the survey be repeated. Since known 3D seismic binning processes acquire subsurface seismic coverage combining seismic data from seismic streamers at different locations, it is desirable to have the ability to accurately control the position and shape of the streamer cables during marine 3D seismic surveys.

However, current designs of birds typically do not alleviate these lateral positioning problems for streamers. Thus, a variety of streamer positioning devices have been developed to also control the streamer position in the lateral direction. A number of these positioning devices are surface deflectors attached to the streamers directly or via towing cables to maintain the streamers at a lateral offset to the pathway of a towing vessel.

These positioning devices include diverters, which typically have fins or wings for urging the diverter and attached streamer away from the centerline of the seismic array. These positioning devices also include deflectors such as paravanes attached to streamer cables, with wing members and pivoting diving planes, and steerable tail buoys for controlling the position of the tail end of towed streamer cables.

Another positioning device is an otter board connected with a float on the water surface and with one or more foils positioned to laterally guide a towed streamer. Another positioning method is to use surface bodies or vessels which are which are equipped with a tilted keel or foils, so that the vessel is towed at an angle, thus achieving a lateral force.

The common feature of these streamer-positioning methods is that they all have a connection with the surface. The connection with the surface will cause waves to be generated, giving rise to unwanted noise and vibrations for the towing equipment. In some cases, there will also be problems with maintaining the equipment at a constant depth, especially when the survey is being conducted in heavy seas. It is also a problem to keep the equipment on the correct course, with the equipment usually drifting in step with the waves. The equipment is subject to a considerable degree of wear and damage when it is exposed to those forces that are associated with a connection to the surface.

Also, such positioning devices are typically bulky and require significant storage space on board a seismic vessel during transport to the seismic survey site. When the survey site is reached, the positioning devices must be removed from storage and attached to the other seismic equipment to be deployed into the water. However, such systems are time consuming to deploy and retrieve, and further are often not adjustable once positioned in the water.

Another problem is that surface vessels of floats cause a great deal of friction. Severe friction gives rise to increased fuel expenses and increased difficulty in obtaining tow width. The same will apply to the actual connection consisting of wires, ropes, chains or the like between the gun array and the surface vessel or float, and the connection between the streamer and the surface vessel or float.

The surface connection also makes the vessels particularly vulnerable to flotsam. In the event of a collision between a vessel and some flotsam, the towing system or parts of it will often be damaged. In a collision with flotsam, the vessel could change direction, thus causing large sections of the towing system to be damaged. The same thing will happen if it comes into contact with fishing tackle or other equipment that may be in the location of the tow.

Thus, streamer-positioning devices without a connection to the surface have been developed. One example of such a lateral control system is the Q-Fin steerable streamer system developed by WesternGeco of Houston, Tex. This system has wings or fins that on the streamer itself that control the streamer in both depth and lateral direction. An example of this system is disclosed in U.S. Pat. No. 6,671,223 "Control Devices for Controlling the Position of a Marine Seismic Streamer" to Bittleston.

The system in Bittleston U.S. Pat. No. 6,671,223 comprises a body mechanically connected in series between streamer sections, with sensor means for determining its angular position in a plane perpendicular to the longitudinal axis of the streamer and two opposed control surfaces (wings) projecting outwardly from the body, with each control surface being rotatable about an axis extending transversely of the streamer. Finally, the system contains control means responsive to control signals and the sensor means to independently adjust the respective angular position of the two control surfaces to control both the lateral and depth position of the streamer. The body of this steerable streamer system does not have to be attached or detached from the streamer during deployment from or retrieval onto, respectively, a streamer winch. However, the control surfaces do have to be detached for storage.

Another lateral control system is described in U.S. Pat. No. 5,443,027 "Lateral Force Device for Underwater Towed Array" to Owsley et al. The system disclosed in Owsley et al. U.S. Pat. No. 5,443,027 comprises a hollow spool and a winged fuselage rotatably mounted around a streamer section. The winged fuselage has a relatively positively buoyant top half and a relatively negatively buoyant bottom half. The relative buoyancies are preset and determine the lateral position control force afforded. Owsley et al. claim that the device can remain on the streamer and be stored on the streamer winch without damage, but also point out that it is easy and inexpensive to replace the devices when damaged.

Another lateral control system is disclosed in U.S. Pat. No. 6,011,752 "Seismic Streamer Position Control Module" to Ambs et al. The system disclosed in Ambs et al. U.S. Pat. No. 6,011,752 comprises a position control module with tapered ends co-axially attached to an exterior of a streamer section coupling module. The position control module contains one or more recesses into which one or more control surfaces are initially recessed and then deployed outward to control the lateral and depth position of the streamer. With the control surfaces recessed, the relatively low profile of the position control modules allows the streamer to be deployed from or retrieved onto a streamer winch without having to attach or detach anything.

Thus, a need exists for an apparatus for steering a marine seismic streamer that achieves an efficient and correctly-positioned tow with substantial shifting force and low drag, reduces tow friction, reduces tow noise, and reduces wear and damage. In particular, a need exists for a steering device that is compact enough to not interfere with streamer deployment and retrieval operations and can remain on the streamer during storage on a streamer winch.

BRIEF SUMMARY OF THE INVENTION

The invention is an apparatus for steering a marine seismic streamer. In one aspect, the invention comprises at least two hinged sections pivotally coupled to each other and connected between two adjacent sections of the seismic streamer, and a bend control unit that controls bending of the hinged sections relative to the longitudinal axis of the seismic streamer.

In one embodiment, the invention further comprises a roll sensor which determines rotational orientation of the body and transmits the orientation to the bend control unit. The bend control unit then controls the bending of the hinged sections based on the rotational orientation of the body transmitted by the roll sensor.

In another embodiment, the invention further comprises a lateral position sensor that determines lateral position of the body and transmits the lateral position to the bend control unit. The bend control unit then controls the bending of the hinged sections based on the lateral position of the body transmitted by the lateral position sensor.

In yet another embodiment, the invention further comprises a depth sensor which determines depth of the body and transmits the depth to the bend control unit. The bend control unit then controls the bending of the hinged sections based on the depth of the body transmitted by the depth sensor.

BRIEF DESCRIPTION OF THE DRAWINGS

The invention and its advantages may be more easily understood by reference to the following detailed description and the attached drawings, in which.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

The invention is an apparatus for steering a marine seismic streamer. In one embodiment, the invention is a device that may be used to laterally shift, with respect to a towing ship, each of an assembly of seismic streamers. In another embodiment, the invention is a steering device that may also be used to vertically shift, with respect to the water surface, each of an assembly of seismic streamers. In particular, the invention is a streamer steering device that is integrated with the streamer and is of a sufficiently compact size as to allow for the streamer to be stored on a streamer winch without detaching the steering device.

The streamer steering device according to the invention generates steering force radially around a seismic streamer by bending in an appropriate direction and forcing water flow around the bend in the steering device. The bend in the steering device generates a steering force by deflecting the fluid flow of the water flowing around the towed seismic streamer. This deflection of the fluid flow generates lift by changing the magnitude (speed) and direction of the water's flow velocity. On the outwards concave side of the bend in the steering device, the fluid flow is forced outward away from the device and becomes relatively faster, leading to lower water pressure. On the inwards convex side of the bend in the steering device, the fluid flow is forced inward toward the device and becomes relatively slower, leading to higher water pressure. The force imbalance due to the difference in pressure causes an outward steering force, perpendicular to the initial flow direction.

By controlling the direction of the bend of the steering device, a steering force can be generated in any radial direction. Thus, the steering device can control the steering force on the streamer in both the lateral and vertical directions. In addition, the steering device can control the size of the steering force by controlling the amount of the bend.

Figure 1:
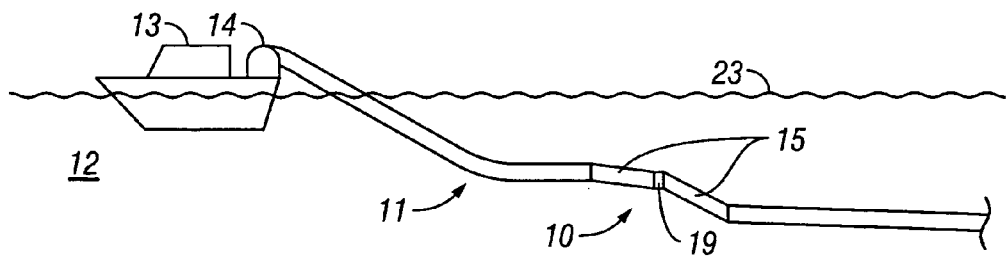
FIG. 1 is an elevation view illustrating an embodiment of the invention for steering a marine seismic streamer.
Figure 2:
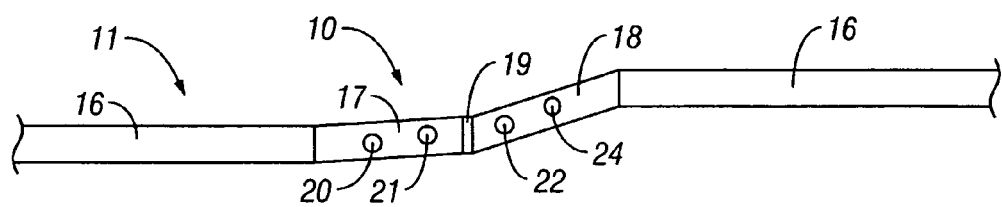
FIG. 2 is an elevation view illustrating an embodiment of the invention for a marine seismic streamer steering device.
Figure 3:
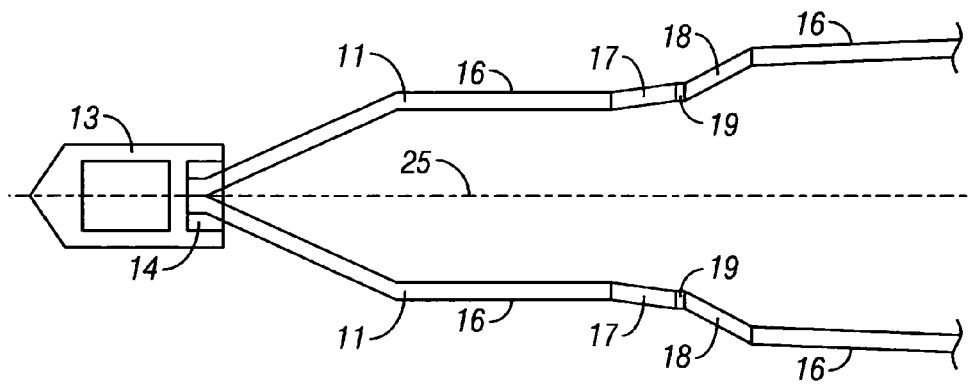
FIG. 3 is a plan view illustrating an embodiment of the invention for steering a marine seismic streamer.

FIGS. 1–3 illustrate the principle of the invention. FIG. 1 shows (not to scale) a schematic elevation view illustrating an embodiment of the invention, a device for steering a marine seismic streamer. The steering device of the invention is generally designated by reference numeral 10. The marine seismic streamer, generally designated by reference numeral 11, is being towed, submerged, through a body of water 12. Typically, a plurality of seismic streamers 11 are towed in a laterally-spaced pattern by a seismic vessel 13. FIG. 1, however, is an elevation view and shows only one seismic streamer 11 for simplicity of illustration. Typically, the seismic streamers 11 are connected to the seismic vessel 13 via a streamer winch 14 for deploying and retrieving the seismic streamers 11 for a seismic survey. In between active seismic surveys, the seismic streamers 11 are stored on the streamer winch 14.

FIG. 2 shows (not to scale) a schematic elevation view illustrating an embodiment of the invention for a marine seismic streamer steering device. The steering device 10, according to one embodiment of the invention, comprises primarily elongate hinged sections 15 (shown in FIG. 1) which are adapted to be mechanically connected in series between streamer sections 16 of the marine seismic streamer 11.

The steering device 10 includes at least two hinged sections 15. The invention may employ any number of hinged sections 15 for flexibility. However, for simplicity, the current embodiment will be illustrated with just two hinged sections 15, although this is not a limitation of the invention. Thus, in FIG. 2, the steering device 10 contains a front hinged section 17 and a rear hinged section 18. The front hinged section 17 and the rear hinged section 18 are connected by a pivotal couple 19 so that the hinged sections 15 may pivot in any radial direction. The front hinged section 17 and the rear hinged section 18 are coupled to the adjacent streamer sections 16 in the conventional manner for streamer section connections.

Accordingly, the steering device 10 may be bent outwardly in any radial direction projecting transversely from the longitudinal axis of the seismic streamer 11 as the steering device 10 is towed through the water 12 in conjunction with the seismic streamer 11. The bending of the hinged sections 15 of the steering device 10 is controlled by a bend control unit 20. In one embodiment, the steering device 10 contains the bend control unit 20. In other embodiments, the bend control unit 20 is located elsewhere on the seismic streamer 11 or on the seismic vessel 13. The location of the bend control unit 20 is not intended to be a limitation of the invention. The bend control unit 20 controls the radial direction and extent of the bending of the hinged sections 15. By controlling the bending of the steering device 10, a steering force can be generated in any radial direction relative to the longitudinal axis of the seismic streamer 11.

A seismic streamer 11 being towed through the water 12 may rotate, which makes it desirable to have a roll sensor 21 in or near the steering device 10. The roll sensor 21 can then transmit the angular orientation of the steering device 10 to the bend control unit 20. The bend control unit 20 will then be able to use this transmitted information to correctly determine the direction of the force necessary to dynamically adjust the position of the seismic streamer 11. Thus, in one embodiment of the invention, the steering device 10 contains a roll sensor 21. In another embodiment, the roll sensor 21 is located near the steering device 10 on the seismic streamer 11. The location of the roll sensor 21 is not intended to be a limitation of the invention. The roll sensor 21 determines the angular position of the steering device 10 and, accordingly, the adjacent streamer sections 16, with respect to the longitudinal axis of the seismic streamer 11. The roll sensor 21 also transmits the determined angular position to the bend control unit 20.

In one embodiment, the steering device 10 is used for lateral position control of a seismic streamer 11. If the steering device 10 is used for lateral control, then at least one lateral position sensor 24 will be incorporated into use with the steering device 10. A command can then be transmitted to the bend control unit 20 about a certain lateral position and the bend control unit 20 will then read its lateral position sensor 24 and adjust to the given lateral position given by the command.

In an alternative embodiment, the steering device 10 is used for both lateral control and depth control. If the steering device 10 is used for depth control, then a depth sensor 22 will be incorporated into use with the steering device 10. A command can then be given to the bend control unit 20 about a certain depth and the bend control unit 20 will then read its depth sensor 22 and adjust to the given depth given by the command.

In one embodiment, the steering device 10 contains a depth sensor 22. In another embodiment, the depth sensor 22 is located near the steering device 10 on the seismic streamer 11. The location of the depth sensor 22 is not intended to be a limitation of the invention. The depth sensor 22 determines the depth of the steering device 10 and, accordingly, the adjacent streamer sections 16, with respect to the water surface 23 (shown in FIG. 1). The depth sensor 22 also transmits the determined depth to the bend control unit 20.

FIG. 3 shows (not to scale) a schematic plan view illustrating an embodiment of the invention, a device for steering a marine seismic streamer 11. An array of marine seismic streamers 11 are shown being towed through the water 12 by the seismic vessel 13. Again, the steering device of the invention is generally designated by reference numeral 10. In one embodiment, the steering device 10 contains a lateral position sensor 24. In another embodiment, the lateral position sensor 24 is located near the steering device 10 on the seismic streamer 11. In yet another embodiment, lateral position information is supplied by an existing external positioning system (not shown) already employed on the seismic vessel 13 and seismic streamers 11. Such positioning systems are well known in the art. The lateral position sensor 24 determines the lateral position of the body 15 and, accordingly, the adjacent streamer sections 16, with respect to the line of travel 25 of the seismic vessel 13 towing the seismic streamers 11. The lateral position sensor 24 also transmits the determined lateral position to the bend control unit 20. The location of the lateral position sensor 24 or the source of the lateral position information is not intended to be a limitation of the invention.

In the intended use of the steering device 10, according to one embodiment of the invention, transmissions from the roll sensor 21, depth sensor 22 (if employed), and lateral position sensor 24 are sent on a regular basis to the bend control unit 20. In addition, the desired position of the streamer 11 is concurrently sent to the bend control unit 20. The determination of the desired streamer position may be accomplished by any of the conventional means well known in the art and is not intended to be a limitation of the invention. The bend control unit 20 will compare the current lateral position of the steering device 10 as transmitted by the lateral position sensor 24 to the desired lateral position to determine a required adjustment in lateral position. Similarly, the bend control unit 20 will compare the current depth of the steering device 10 as transmitted by the depth sensor 22 to the desired depth to determine a required adjustment in depth. The bend control unit 20 will then calculate the force and direction required to correct the current lateral and vertical position of the steering device 10 to the desired position. The bend control unit 20 will additionally note the current angular position of the steering device 10 as transmitted by the roll sensor 21.

Using the transmitted rotational orientation, lateral position, and depth of the steering device 10, the bend control unit 20 can calculate the direction and extent of bending of the hinged sections 15 needed to generate the required steering force and direction that will adjust the position of the steering device 10 to the desired lateral and vertical position. This adjustment process will be repeated on a regular basis to dynamically maintain the desired lateral and vertical position of the steering device 10 as it is towed in conjunction with the seismic streamers 11.

In another embodiment of the invention, the transmissions of the current position and orientation of the steering device 10 and its desired position are sent to a bend computing unit (not shown) separate from the bend control unit 20. This bend computing unit could be positioned in the steering device 10, on the streamers 11, or in the seismic vessel 13. The position of the bend computing unit is not intended to be a limitation of the invention. The comparison of the current positions to the desired positions of the streamer 11 is made in the bend computing unit. Then the calculation of the required bending of the hinged sections 15 of the steering unit 10 will also be made in the bend computing unit and transmitted to the bend control unit 20 for execution. In this embodiment, the bend control unit 20 is only responsible for controlling the bending of the hinged sections 15 to bring about the desired lateral and vertical position adjustment of the steering unit 10, as instructed by the separate bend computing unit.

The steering device 10 of the invention has the advantage of being sufficiently compact to be conveniently stored on the streamer winch 14. This advantage removes the need to attach the steering device 10 for deployment of the seismic streamers 11 or to detach the steering device 10 for retrieval of the seismic streamers 11. This advantage results in considerable savings in time, storage space, and safety concerns.

The streamer steering device 10 according to the invention makes it possible to steer the seismic streamer 11 in any direction in the water 12. Thus, the invention can be used in combination with existing birds to control the position of an array of seismic streamers 11. Alternatively, the invention can even be used to reduce the need for existing birds.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

I claim:

1. An apparatus for steering a marine seismic streamer, comprising:

at least two hinged elongate steering sections pivotally coupled to each other and connected between two adjacent streamer sections of the seismic streamer; and a bend control unit which calculates bending extent and bending directions of the hinged steering sections that adjust lateral and vertical positions of the seismic streamer and controls bending of the hinged steering sections relative to the longitudinal axis of the seismic streamer to the calculated bending extent and in the calculated bending directions.

2. The apparatus of claim 1, further comprising:

a roll sensor which determines rotational orientation of the hinged steering sections and transmits the orientation to the bend control unit.

3. The apparatus of claim 2, wherein the bend control unit controls the direction and the extent of the bending of the hinged steering sections based on the rotational orientation of the body transmitted by the roll sensor, generating the calculated steering force in the calculated steering direction.

4. The apparatus of claim 3, further comprising:

a lateral position sensor which determines lateral position of the body and transmits the lateral position to the bend control unit.

5. The apparatus of claim 4, wherein the bend control unit controls the direction and the extent of the bending of the hinged steering sections based on the lateral position of the body transmitted by the lateral position sensor, generating the calculated steering force in the calculated steering direction.

6. The apparatus of claim 5, further comprising:

a depth sensor which determines depth of the body and transmits the depth to the bend control unit.

7. The apparatus of claim 6, wherein the bend control unit controls the direction and the extent of the bending of the hinged steering sections based on the depth of the body transmitted by the depth sensor, generating the calculated steering force in the calculated steering direction.

8. The apparatus of claim 1, wherein the bend control unit calculates steering forces and steering directions for the hinged steering sections that adjust the lateral and vertical positions of the seismic streamer and calculates the bending extent and the bending directions of the hinged steering sections that provide the calculated steering forces and the calculated steering directions.

* * * * *